(12) United States Patent
Zhang et al.

(10) Patent No.: US 7,974,476 B2
(45) Date of Patent: Jul. 5, 2011

(54) FLEXIBLE MQDF CLASSIFIER MODEL COMPRESSION

(75) Inventors: Qi Zhang, Redmond, WA (US); Michael T. Black, Bellevue, WA (US); Wei Yu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 11/755,195

(22) Filed: May 30, 2007

(65) Prior Publication Data

US 2008/0298691 A1 Dec. 4, 2008

(51) Int. Cl.
*G06K 9/62* (2006.01)
*G06K 9/18* (2006.01)
(52) U.S. Cl. .................. 382/225; 382/185; 382/186
(58) Field of Classification Search .............. None
See application file for complete search history.

(56) References Cited

U.S. PATENT DOCUMENTS

| | | | |
|---|---|---|---|
| 4,155,072 A | 5/1979 | Kawa | |
| 5,602,938 A | 2/1997 | Akiyama et al. | |
| 5,854,855 A | 12/1998 | Errico et al. | |
| 6,345,109 B1 | 2/2002 | Souma et al. | |
| 6,721,452 B2 | 4/2004 | Confer et al. | |
| 7,031,530 B2 | 4/2006 | Driggs et al. | |
| 7,181,062 B2 | 2/2007 | Ii et al. | |
| 2003/0169925 A1 | 9/2003 | Polonowski | |
| 2009/0304296 A1* | 12/2009 | Zhang et al. | 382/243 |

OTHER PUBLICATIONS

Mitoma et al. (Sep. 2005) "Online character recognition based on elastic matching and quadratic discrimination." Proc. 8th Int'l Conf. on Document Analysis and Recognition, pp. 36-40.*

Kimura et al. (Jan. 1987) "Modified quadratic discriminant functions and the application to Chinese character recognition." IEEE Trans on Pattern Analysis and Machine Intelligence, vol. PAMI-9, No. 1, pp. 149-153.*

Liu, C., "Handwritten Chinese Character Recognition: Effects of Shape Normalization and Feature Extraction," http://hal.inria.fr/docs/00/12/04/08/PDF/liama2.pdf, 15 pages (Publicly known at least as early as May 30, 2007).

Liu, C., "High Accuracy Handwritten Chinese Character Recognition Using Quadratic Classifiers with Discriminative Feature Extraction," http://hal.inria.fr/docs/00/12/04/19/PDF/liama4.pdf, 4 pages (Copyright 2006).

Liu, H. et al., "Handwritten Character Recognition Using Gradient Feature and Quadratic Classifier with Multiple Discrimination Schemes," *Eighth International Conference on Document Analysis and Recognition*, vol. 1, pp. 19-23 (Aug. 29-Sep. 1, 2005) (1 page Abstract).

Omachi, S. et al., "Precise Estimation of High-Dimensional Distribution and Its Application to Face Recognition," *Proceedings 17th Intenrational Conference on Pattern Recognition*, http://www.tbgu.ac.jp/ait/fan/paper/icpr2004-1-220.pdf, 4 pages (Aug. 2004).

* cited by examiner

*Primary Examiner* — Bhavesh M Mehta
*Assistant Examiner* — Barry Drennan
(74) *Attorney, Agent, or Firm* — Merchant & Gould (57) ABSTRACT

A memory footprint of an Modified Quadratic Discriminant Function (MQDF) pattern recognition classifier is reduced without resulting in unacceptable classification accuracy degradation. Covariance matrices for multiple classes are clustered into a smaller number of matrices where different classes share the same set of eigenvectors. According to another approach, different numbers of principal components are stored for different classes based on criteria such as class usage frequency, larger variation in writing, and the like, resulting in fewer principal components to be stored in memory.

12 Claims, 8 Drawing Sheets

FLEXIBLE MQDF CLASSIFIER MODEL COMPRESSION

BACKGROUND

Pattern recognition aims to classify data (patterns) based on either a priori knowledge or on statistical information extracted from the patterns. The patterns to be classified are usually groups of measurements or observations, defining points in an appropriate multidimensional space. A pattern recognition system typically comprises a sensor that gathers the observations to be classified or described, a feature extraction mechanism that computes numeric or symbolic information from the observations, and a classification or description scheme that does the actual job of classifying or describing observations, relying on the extracted features. Pattern recognition systems are commonly used in speech recognition, document classification, shape recognition, and handwriting recognition.

The Modified Quadratic Discriminant Function (MQDF) is a statistical classification method that can be applied to the problem of pattern recognition, such as handwritten character recognition. MQDF classifiers can scale well with a large number of output classes, which makes them well suited to East Asian character recognition because East Asian languages include tens of thousands characters. An MQDF classifier stores a variable number of means, eigenvalues and eigenvectors that describe the characteristics of each class. The eigenvectors are chosen using principal component analysis of covariance matrices generated per class, and so are often referred to as principal components.

Commonly available implementations of MQDF classifiers store the same number of principal components for all output classes. One significant drawback of the existing MQDF classifier implementations is a large memory footprint. It is possible to reduce the memory footprint by reducing the number of principal components stored for each class, but reducing the number of principal components beyond a certain point may result in unacceptable classification accuracy degradation.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to reducing a memory footprint of an MQDF classifier without resulting in unacceptable classification accuracy degradation. Different number of principal components may be stored for different classes based on a class usage frequency, larger variation in representation, and the like. According to some embodiments, multiple classes may be clustered together to share one or more covariance matrices. According to further embodiments, these two techniques may be combined, covariance matrix sharing first, then using different number of principal components for the shared covariance matrices to reach further model compression.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a memory footprint of an MQDF classifier for a pattern recognition system may be reduced by storing different numbers of principal components for different classes and/or by clustering multiple classes to share a single covariance matrix. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
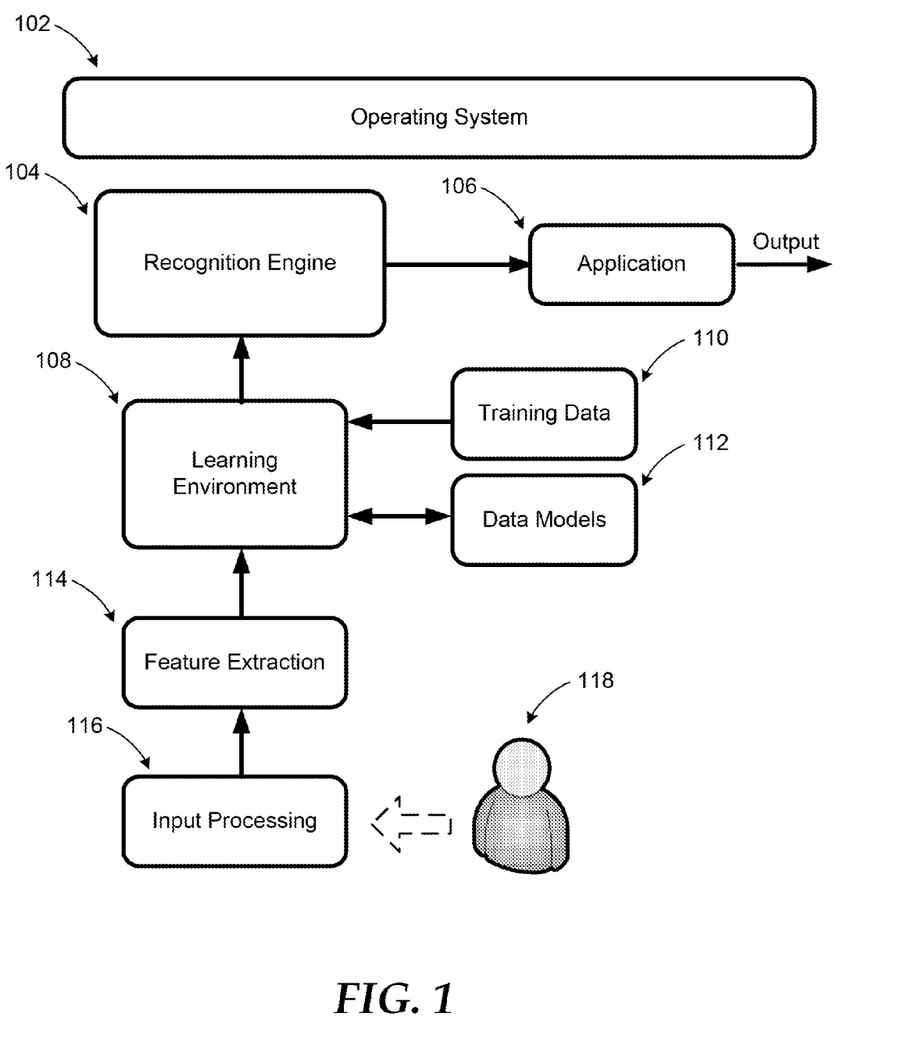
FIG. 1 illustrates an example architecture of a system employing pattern recognition for an application.

Referring to FIG. 1, an example architecture of a system employing pattern recognition for an application is illustrated. Pattern recognition aims to classify data (patterns) based on either a priori knowledge or on statistical information extracted from the patterns. The patterns to be classified are usually groups of measurements or observations, defining points in an appropriate multidimensional space.

The classification or description scheme in a pattern recognition system is usually based on the availability of a set of patterns that have already been classified or described. This set of patterns is termed the training set and the resulting learning strategy is characterized as supervised learning. Learning can also be unsupervised, in the sense that the system is not given an a priori labeling of patterns, instead it establishes the classes itself based on the statistical regularities of the patterns.

The classification or description scheme usually uses one of the following approaches: statistical (or decision theoretic), syntactic (or structural). Statistical pattern recognition is based on statistical characterizations of patterns, assuming that the patterns are generated by a probabilistic system. Structural pattern recognition is based on the structural interrelationships of features. A wide range of algorithms can be applied for pattern recognition, from very simple Bayesian classifiers to much more powerful neural networks.

Typical pattern recognition applications include automatic speech recognition, classification of text into several categories (e.g. spam/non-spam email messages), the automatic recognition of handwriting, or the automatic recognition of shapes (such as human faces).

As shown in FIG. 1, an operating system (102) with multiple pattern recognition enabled applications may provide an example implementation scenario for some embodiments. The operating system 102 may typically control a number of applications (e.g. application 106) including a word processing application, a spreadsheet application, a media player application, and the like. Each application may use a different aspect of pattern recognition such as handwriting recognition, speech recognition, shape recognition, and so on.

In a typical pattern recognition system, two separate processes occur: training and runtime recognition. In the training process, training data 110 is processed through input processing 116 then feature extraction 114. As a result, data models 112 are generated by learning environment 108.

In runtime recognition process, which shares processes 116 and 114 with the training process, operations begin with input processing (116) on input from a user 118 or from an information store (not shown). Depending on the pattern recognition type, the input may be speech, handwriting (ink), graphical input, and the like. For example, in a speech recognition system, an audio subsystem may convert sound input to audio signals which is then converted to textual data.

Feature extraction process 114 determines recognizable portions of the input data for processing in the learning environment 108. Learning environment 108 in conjunction with recognition engine 104 may include a number of base recognition modules and a combiner for performing the pattern recognition. Pattern recognition as performed by the recognition engine 104 in conjunction with the learning environment is the process, where input data is classified for software applications (e.g. application 106). Recognition engine 104 also loads in data models 112 (generated by training process mentioned above).

In an example speech recognition system, the recognition engine 104 may be a speech recognition engine comprising a number of components such as a language modeling module, a training module, a language model customization module, and the like. Speech recognition engine may recognize words, phrases, and the like, based on customized language and acoustic models and provides textual versions of the audio utterances. A grammar service may perform the task of managing recognized text before it is provided to applications such as a word processing application. Similar examples can be given for handwriting recognition systems, shape recognition systems, and the like.

In performing recognition, the system typically uses classifiers to classify different classes of known patterns. Depending on complexity of each class and number of classes, large amounts of memory may be required to execute modules performing classification.

Components of a pattern recognition system may be loaded into a server, executed over a distributed network, executed in a client device, and the like. Furthermore, the components described herein are for illustration purposes only, and do not constitute a limitation on the embodiments. A flexible MQDF classifier model compression may be implemented using fewer or additional components in various orders. Individual components may be separate applications, or part of a single application. Moreover, the pattern recognition system or its components may include individually or collectively a user interface such as a web service, a Graphical User Interface (GUI), and the like.

According to one embodiment, a memory footprint of an MQDF classifier may be significantly reduced by storing a different number of principal components for different classes. Specifically, a larger number of principle components may be allocated to those classes that are used in a higher frequency and/or represented with larger variations, while a smaller number of principle components may be allocated to those classes that are used in a lower frequency and/or represented with smaller variations. By allocating the number of principle components in such a way, the memory footprint required in an MQDF classifier may be significantly reduced without an unacceptable degradation of classification accuracy.

According to another embodiment, multiple classes may be clustered together to share one single covariance matrix again reducing the needed memory footprint significantly. Multiple classes may share the same set of principal eigenvectors, reducing the number of vectors that need to be stored. The covariance matrix clustering may be implemented uniformly across all classes or divided into smaller groups to allow greater compression of characters with lower unigram frequency. Before describing details of the above mentioned approaches, some of the commonly used terms and concepts are explained below.

A linear transformation inputs a vector and changes it, usually changing both its magnitude and its direction. An eigenvector of a given linear transformation is a vector whose direction is not changed by that transformation. The corresponding eigenvalue is the proportion by which an eigenvector's magnitude is changed. For example, an eigenvalue of 2 means that the length of the eigenvector has been doubled. An eigenspace of a given transformation is the set of all eigenvectors of that transformation that have the same eigenvalue, together with the zero vector. An eigenspace is an example of a subspace of a vector space.

In linear algebra, every linear transformation can be given by a matrix, which is a rectangular array of numbers arranged in rows and columns. Thus, eigenvalues, eigenvectors, and eigenspaces of a given matrix can be calculated. An important tool for describing eigenvalues of square matrices is the characteristic polynomial: saying that λ is an eigenvalue of A is equivalent to stating that the system of linear equations (A−λI) v=0 (where I is the identity matrix) has a non-zero solution v (an eigenvector), and so it is equivalent to the determinant: det(A−λI)=0.

The function p(λ)=det(A−λI) is a polynomial in λ, since determinants are defined as sums of products. This is the characteristic polynomial of A: the eigenvalues of a matrix are the zeros of its characteristic polynomial. All the eigenvalues of a matrix A can be computed by solving the equation $p_A(\lambda)$= 0. If A is an n*n matrix, then $p_A$ has degree n and A can therefore have at most n eigenvalues. If the matrix is over an algebraically closed field, such as the complex numbers, then the fundamental theorem of algebra says that the characteristic equation has exactly n roots (zeroes), counted with multiplicity. Therefore, any matrix over the complex numbers has an eigenvalue. All real polynomials of odd degree have a real number as a root, so for odd n, every real matrix has at least one real eigenvalue. However, if n is even, a matrix with real entries may not have any real eigenvalues.

Once the eigenvalues λ are known, the eigenvectors can then be found by solving: (A−λI) v=0, where v is in the null space of A−λI.

In statistics and probability theory, the covariance matrix is a matrix of covariances between elements of a vector. Thus, covariance is the measure of how much two random variables vary together. If two variables tend to vary together (i.e. when one of them is above its expected value, then the other variable tends to be above its expected value too), then the covariance between the two variables will be positive. On the other hand, if when one of the variables is above its expected value and the other variable tends to be below its expected value, then the covariance between the two variables will be negative.

The covariance between two real-valued random variables X and Y, with expected values E(X)μ and E(Y)=v is defined as:

$$\mathrm{Cov}(X,Y))=E((X-\mu)(Y-v)) \text{ or } \mathrm{Cov}(X,Y)=E(X*Y)-\mu v,$$

where E is the expected value operator. If X and Y are independent, then their covariance is zero. Random variables whose covariance is zero are called uncorrelated.

Figure 2:
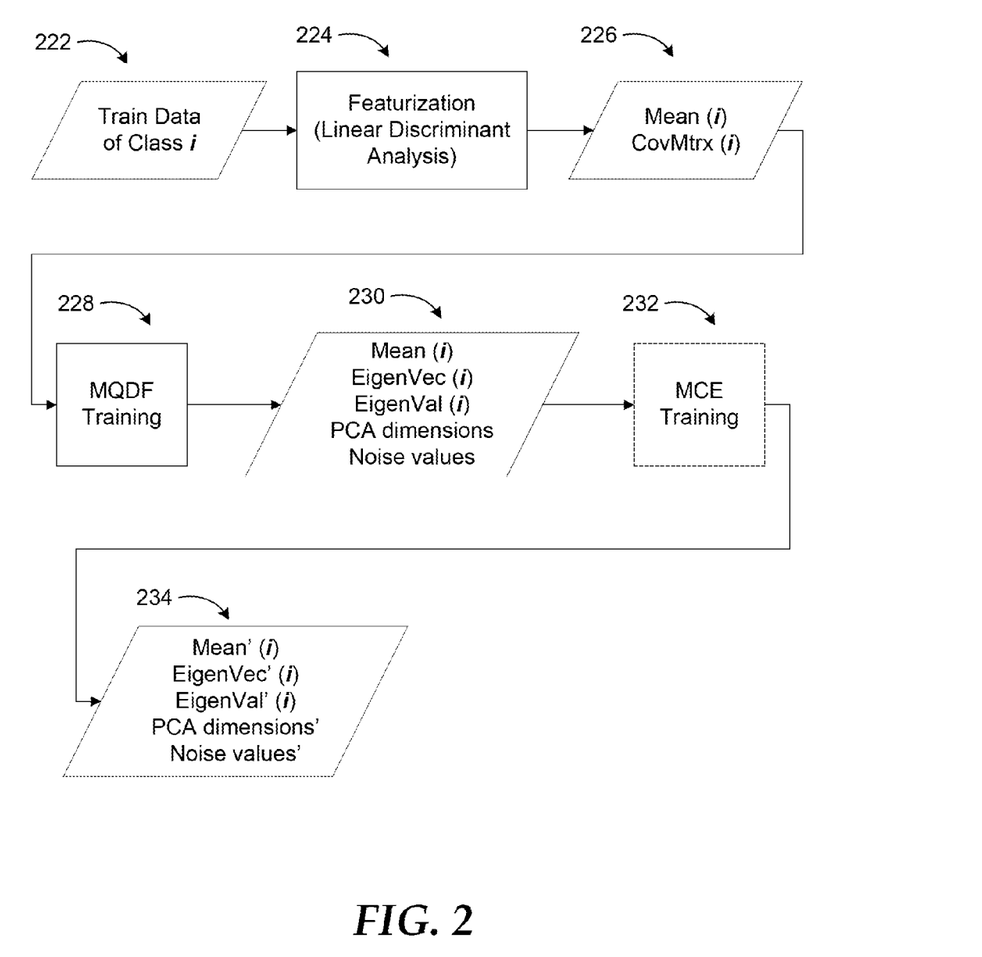
FIG. 2 illustrates an example MQDF training process where each class has its own covariance matrix and same number of principal component analysis (PCA) dimensions.

FIG. 2 illustrates an example MQDF classifier training process where each class has its own covariance matrix and same number of principal component analysis (PCA) dimensions. As mentioned previously, the Modified Quadratic Discriminant Function (MQDF) is a statistical classification method that can be applied to the problem of handwritten character recognition. The MQDF is derived from the Quadratic Discriminant Function (QDF). The QDF assumes a multivariate Gaussian distribution for each class. The Gaussian distribution of each class is estimated using training samples within a certain dimensional feature space (for example a 128 dimension feature space).

The MQDF is similar to the QDF except that it attempts to reduce the number of eigenvalues and eigenvectors and improve classification accuracy using principal component analysis. Given an n dimensional feature space, the k largest eigenvalues, k<n, are preserved while the remaining (n−k) eigenvalues are replaced with a common value. This can improve classification accuracy because of the error in estimating small eigenvalues with a limited set of training samples. Another advantage of the MQDF over the QDF is that only the principal eigenvectors need to be stored, and the projection computation only needs to be executed on the principal eigenvectors.

MQDF classifiers scale well with a large number of classes. This makes them well suited to applications with lots of classes, such as handwritten East Asian character recognition because there are tens of thousands different characters in East Asian languages. However, the large number of classes and high dimensionality of the feature space leads to a classifier with a large memory footprint. As discussed earlier, it is possible to reduce the memory footprint of the classifier by reducing the number of principal components that are stored, but if too few principal components are used the classification accuracy suffers.

Training data for a particular class (e.g. class i) 222 is received and used for featurization 224 (feature extraction). In some implementations, optional Linear Discriminant Analysis (LDA) may be performed separately from the feature extraction. For example, 512 features may be extracted and then through LDA those 512 features reduced to 128 features that best separate the output classes. It is also possible to implement the MQDF classifier training compression using the original 512 features without applying LDA.

The mean and covariance matrix (226) for class i are used in MQDF classifier training 228, which provides the mean, the eigenvector and eigenvalues for class i, as well as principal component analysis dimensions and noise values (230). According to some embodiments, an optional Minimum Classification Error (MCE) training process 232 or a similar error detection mechanism may follow the MQDF classifier training to further improve recognition accuracy.

In a conventional MQDF training process, all classes use the same number of principal components. Also, each class has its own covariance matrix and its own set of eigenvectors and eigenvalues.

Figure 3A:
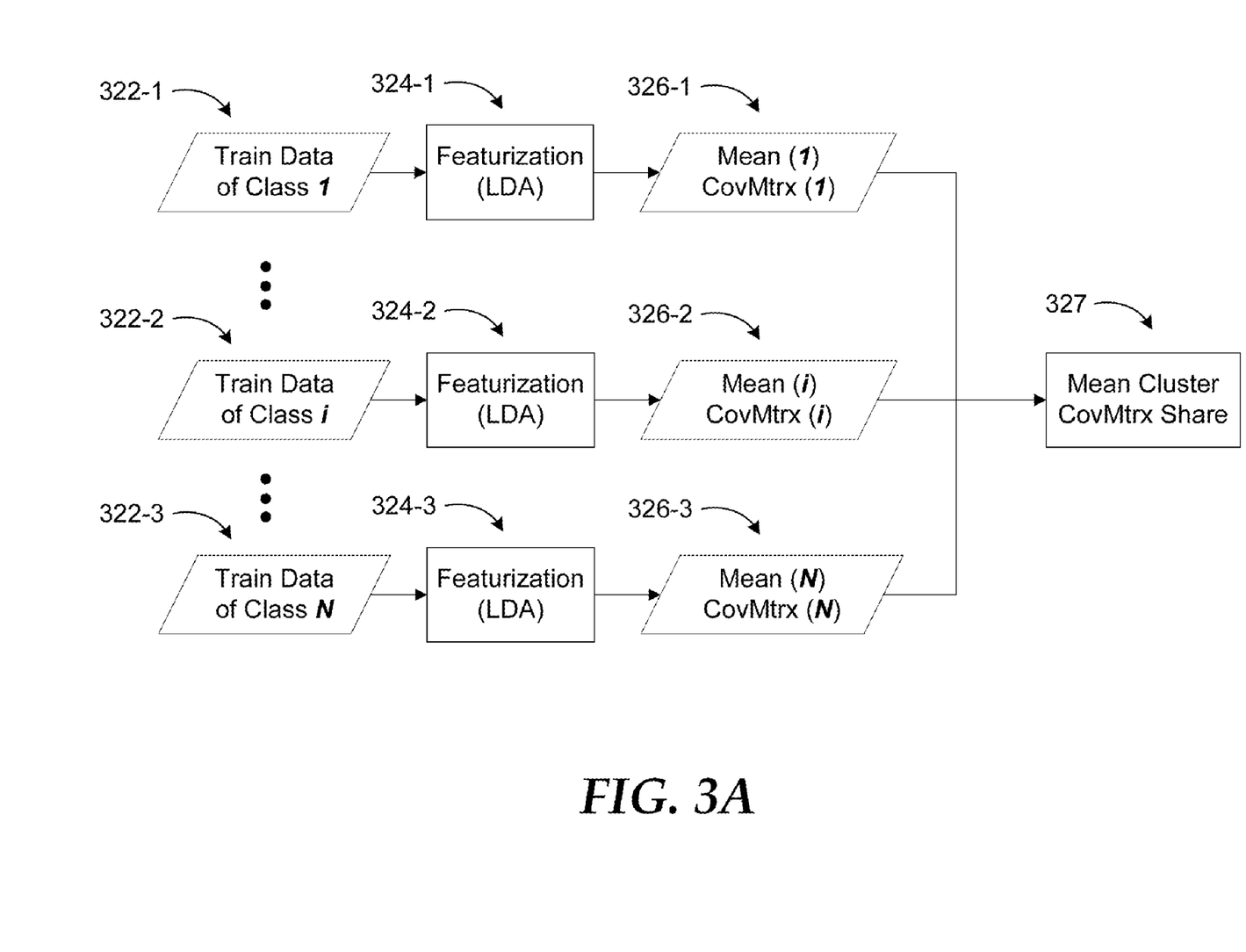
FIGS. 3A, 3B, and 3C illustrate sections of an example MQDF training process incorporating flexible compression according to embodiments.
Figure 3B:
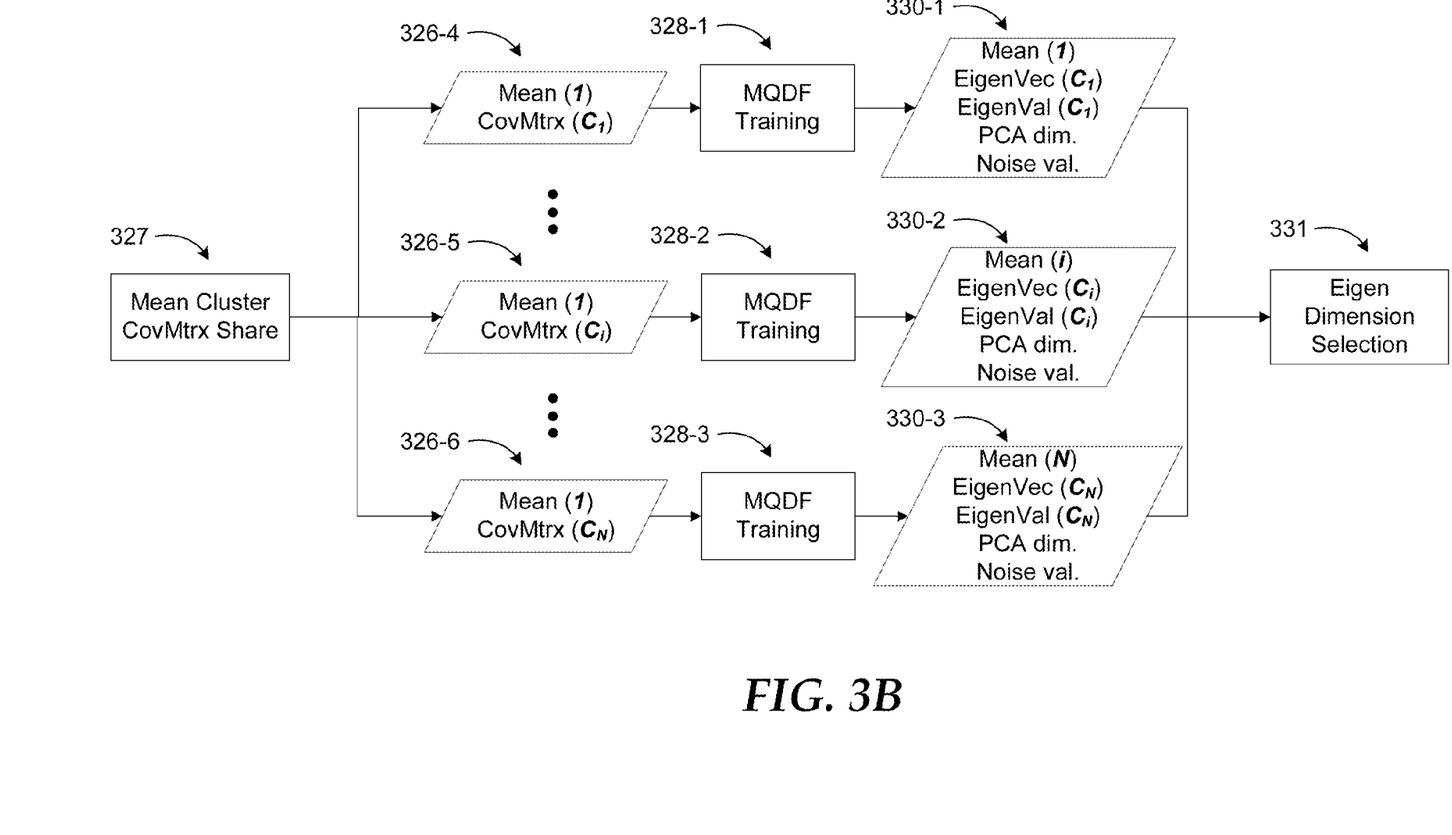
Figure 3C:
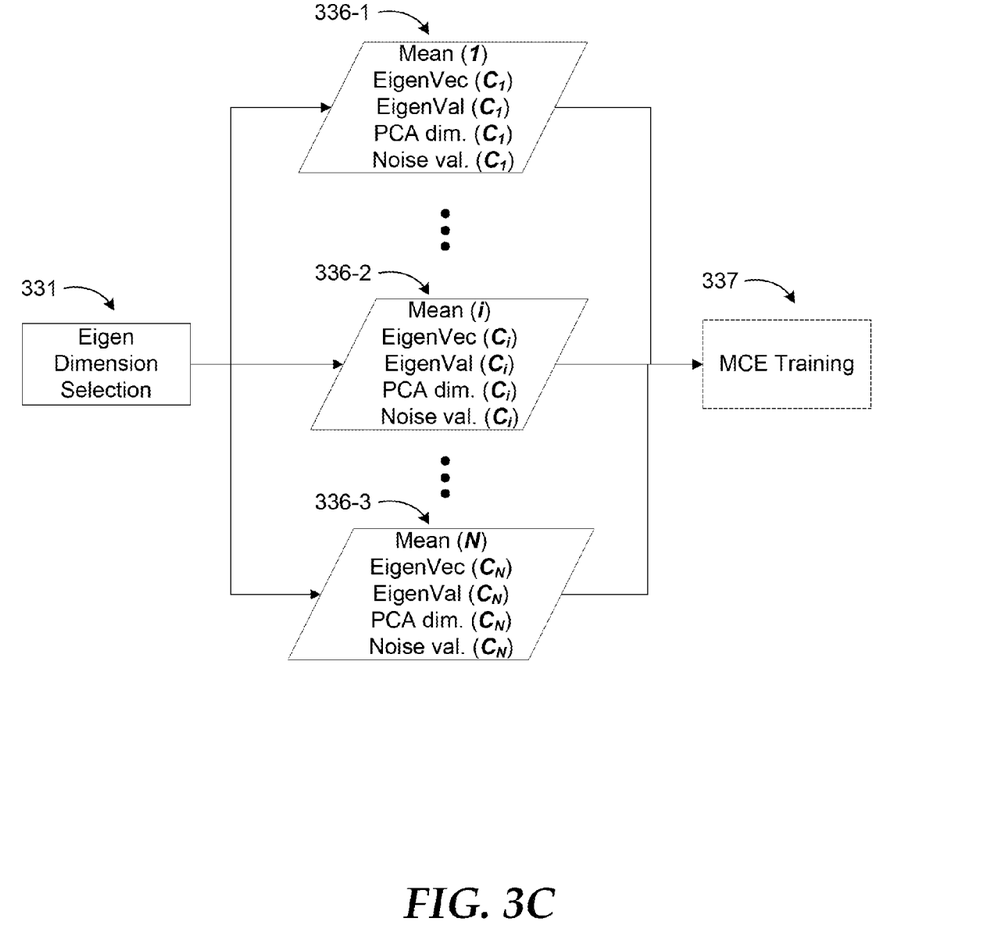

FIGS. 3A, 3B, and 3C illustrate sections of an example MQDF classifier training process incorporating flexible compression according to embodiments. In an MQDF classifier training process incorporating flexible compression, shared covariance matrices may be used for each cluster, where each cluster is determined by some similarity measure of different classes (e.g. class mean), and the shared covariance matrix may be generated with linear combination of class covariance matrices in the cluster. Moreover, different Principal Component Analysis (PCA) dimensions (eigenvector reduction) may be used for each class (or cluster), based on predefined selection criteria (e.g. character category).

A number of MQDF principal components stored for each class in pattern recognition can vary widely and still provide high classification accuracy for end users provided those minor eigenvalue terms can be appropriately chosen, and data model (e.g. language model) information and/or character writing style information have been incorporated when allocating the number of principle components for each class. The same common noise term doesn't necessarily have to be shared across all classes. Even if the noise term is different for each class, using the shared eigenvalue for all minor eigenvectors of a single class can still provide benefits including improved classification accuracy, reduced memory footprint, and increased calculation speed.

As with the above described variable principal component method, covariance matrix clustering can be an effective compression method. It should be noted, that in this context the effectiveness of a compression method is defined by the classification accuracy degradation for a given compression factor.

In an MQDF classifier training process that incorporates flexible compression, the number of principal components $k_i$ can be different for each class and/or cluster i. For example, in the case of East Asian character recognition, possible criteria for choosing the number of principal components include the standard character set the class belongs to and the unigram frequency of the character the class represents. The class covariance matrices are clustered as a whole or within smaller groups. According to one embodiment, the class covariance matrices may be clustered before the principal component transform decomposes the matrices into eigenvectors.

Referring back to FIG. 3A, training data sets for classes 1 through N (e.g. 322-1 to 322-3) are used in featurization processes (e.g. 324-1 to 324-3). The means and covariance matrices (e.g. 326-1 to 326-3) for each class are used in MQDF training. The class covariance matrices are then clustered in operation 327.

Experimental testing on Chinese Simplified handwriting recognizer that supports 6,763 characters shows isolated character classification error rates vary slightly between clustering compression factors 0 and 8, which indicates a significant memory space reduction can be achieved without a corresponding error increase or classification accuracy degradation in pattern recognition.

As FIG. 3B illustrates, means and shared covariance matrices (e.g. 326-4 to 326-6) for each class are provided for MQDF training processes (e.g. 328-1 to 328-3) for each class, which results in means, eigenvectors, eigenvalues, PCA dimensions and noise values for each class (330-1 to 330-3). An eigenvector reduction by selecting principal components may then be performed in eigen dimension selection process 331.

Following the eigenvector reduction in process 331, the principal components from the clustered covariance matrices (336-1 to 336-3) may be provided for an optional minimum error training 337 as shown in FIG. 3C. Experimental testing also shows that covariance matrix clustering compression may outperform principal component reduction alone in some cases.

While individual steps of the MQDF classifier training operations with flexible compression may be performed by individual modules, the processing may also be performed by a single or multiple software or hardware modules, or a combination of two. The embodiments are not limited to a single software module or hardware module implementation. Any combination of software and hardware may be used for implementing MQDF training incorporating flexible compression.

Figure 4:
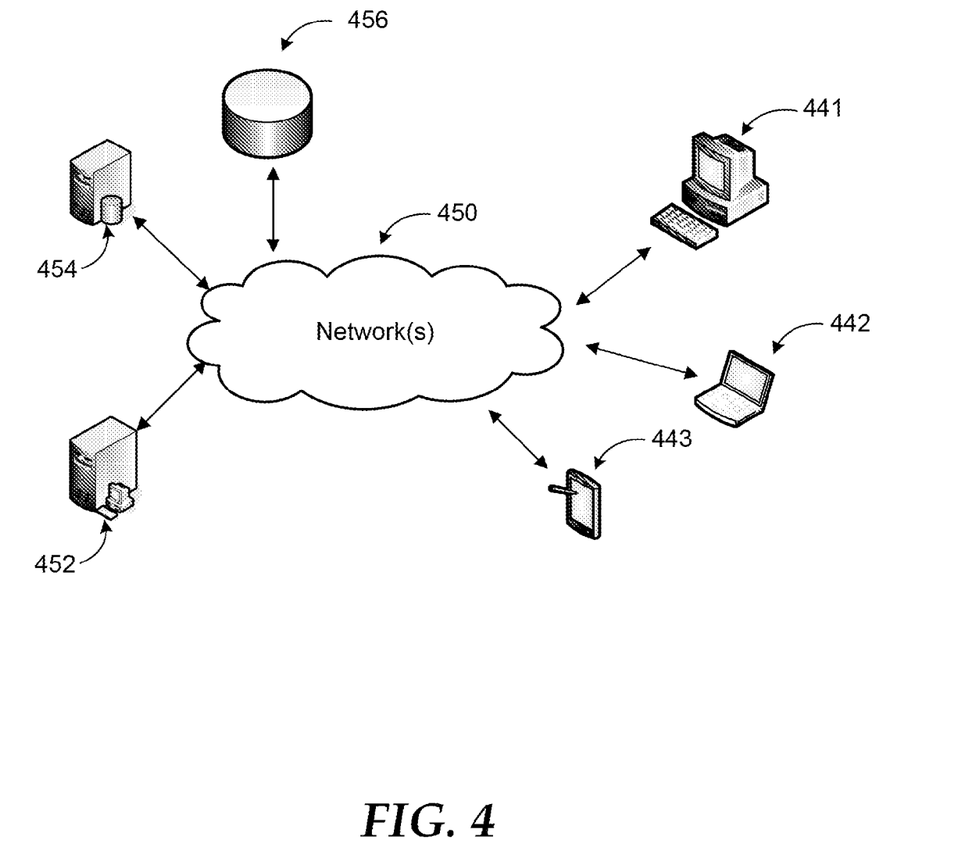
FIG. 4 is an example networked environment, where embodiments may be implemented.

FIG. 4 is an example networked environment, where embodiments may be implemented. MQDF training incorporating flexible compression may be implemented locally on a single computing device. Input data, such as training data, to be processed may be received from one or more computing devices configured in a distributed manner over a number of physical and virtual clients and servers. They may also be implemented in un-clustered systems or clustered systems employing a number of nodes communicating over one or more networks (e.g. network(s) 480).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing MQDF classifier training with flexible compression may involve many more components, relevant ones are discussed in conjunction with this figure.

A pattern recognition engine according to embodiments may be implemented as part of any application that utilizes pattern recognition such as speech recognition, handwriting recognition, document classification, shape recognition, and the like, in individual client devices 441-443. Parts or all of the pattern recognition system may also be implemented in server 452 and accessed from anyone of the client devices (or applications). Data stores associated with input data, training data, and the like, may be embodied in a single data store such as data store 456 or distributed over a number of data stores associated with individual client devices, servers, and the like. Dedicated database servers (e.g. database server 454) may be used to coordinate input and/or training data retrieval and storage in one or more of such data stores.

Network(s) 450 may include a secure network such as an enterprise network, an unsecure network such as a wireless open network, or the Internet. Network(s) 450 provide communication between the nodes described herein. By way of example, and not limitation, network(s) 450 may include wired media such as a wired network or direct-wired connection, and wireless media such as acoustic, RF, infrared and other wireless media.

Many other configurations of computing devices, applications, data sources, data distribution systems may be employed to implement providing MQDF classifier training with flexible compression. Furthermore, the networked environments discussed in FIG. 4 are for illustration purposes only. Embodiments are not limited to the example applications, modules, or processes.

Figure 5:
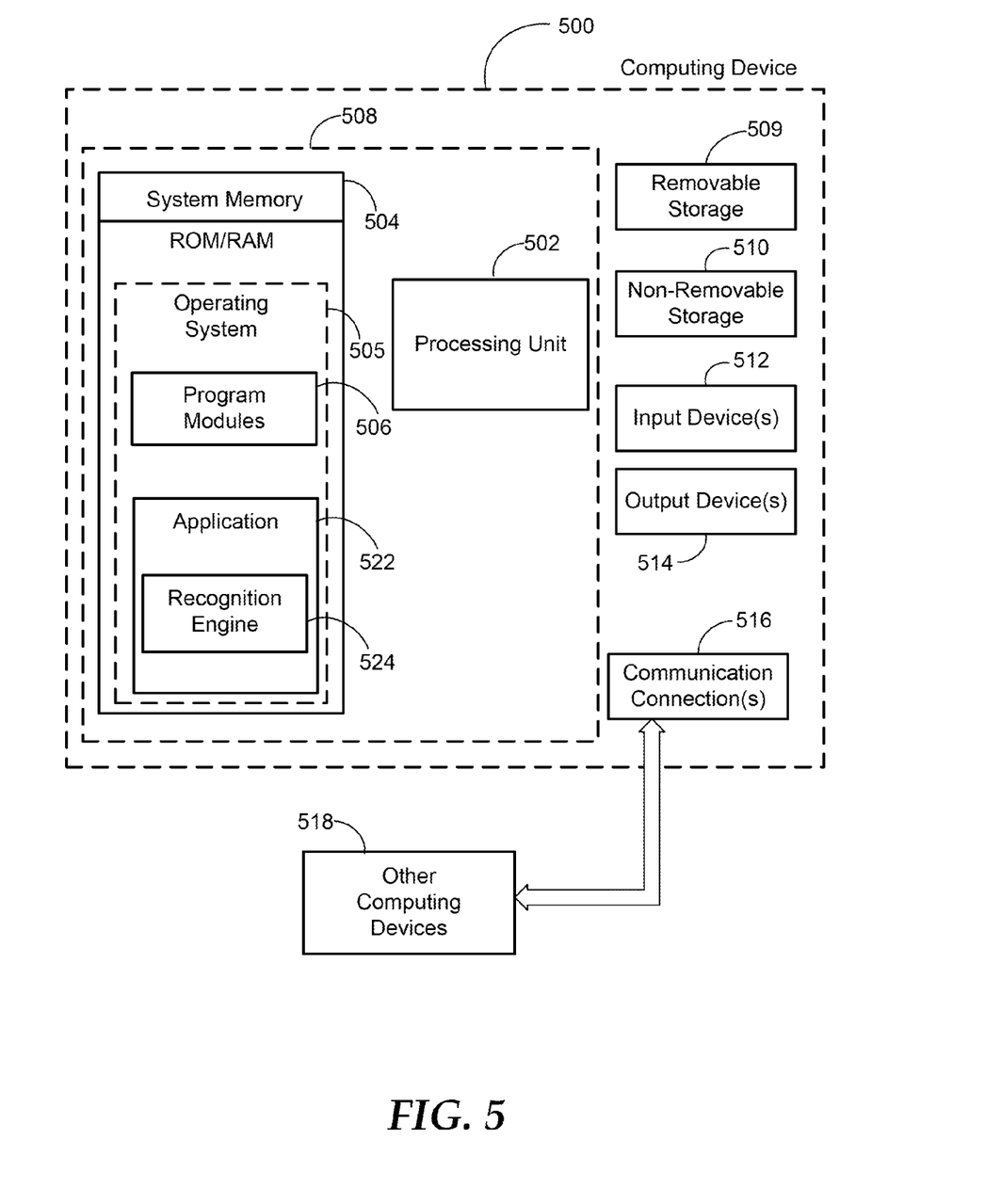
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a server or a client machine. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, application 522 and recognition engine 524.

Application 522 may be any application utilizing pattern recognition as discussed previously. The pattern recognition process may also be executed as a separate application or as an integral module of a service that provides other services to applications associated with computing device 500. Recognition engine 524 performs pattern recognition coordinating training, classification, evaluation, and actual data interpretation. According to some embodiments, flexible compression MQDF classifier training may be employed by the recognition engine 524 to train recognition modules from available training data such that needed memory space for covariance matrices and eigenvectors is reduced. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that provide updates associated with the anti spyware service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
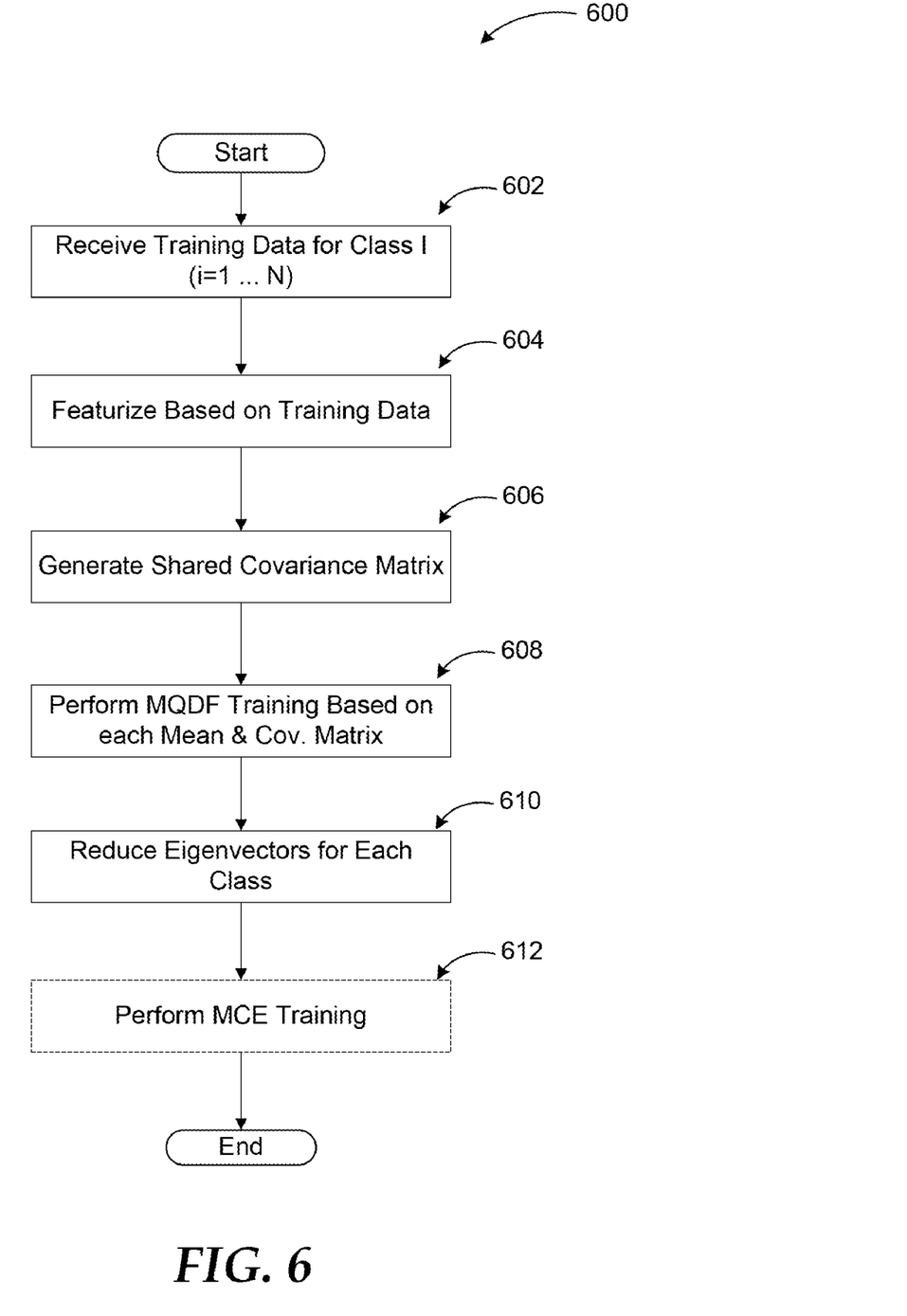
FIG. 6 illustrates a logic flow diagram of a flexible compression MQDF training process according to embodiments.

FIG. 6 illustrates a logic flow diagram of a flexible compression MQDF classifier training process according to embodiments. Process 600 may be implemented as part of a recognition engine in a pattern recognition application.

Process 600 begins with operation 602, where training data for different classes (1 through N) is received. Processing advances from operation 602 to operation 604. At operation 604, featurization is performed based on the training data sets for each class providing means and covariance matrices for each class. According to some embodiments, an optional LDA may be used to reduce the dimension of input features. Processing continues to operation 606 from operation 604. At operation 606, the covariance matrices are clustered generating shared covariance matrices. Processing continues to operation 608 from operation 606.

At operation 608, MQDF classifier training is performed using the means for each class and shared covariance matrices. Processing continues to operation 610 from operation 608, where the eigenvectors are reduced selecting different principal components for each class based on predefined criteria such as character category, class usage frequency, and the like. Through the covariance matrix clustering in operation 606 and eigenvector reduction in operation 610, a memory needed for storing MQDF training components is significantly reduced. Processing continues to optional operation 612 from operation 610.

At optional operation 612, minimum classification error training is performed using the selected principal components for each class. After operation 612, processing moves to a calling process for further actions.

The operations included in process 600 are for illustration purposes. Providing MQDF classifier training incorporating flexible compression may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for performing Modified Quadratic Discriminant Function (MQDF) training with flexible compression in a pattern recognition system, the method comprising:
    receiving, by a computing device, a plurality of training data sets for each of a plurality of classes;
    featurizing, by the computing device, each training data set;
    generating, by the computing device, a mean and a covariance matrix for each of the plurality of classes;
    clustering the covariance matrices, utilizing a predefined compression factor, to generate shared covariance matrices, the predefined compression factor comprising a compression factor, within a predetermined range of compression factors, wherein within the predetermined range of compression factors, there is a slight variation in isolated character classification rates between each of the compression factors in the range, the slight variation being indicative of a significant memory space reduction without at least one of a corresponding error increase and a classification accuracy degradation in the pattern recognition system;
    performing, by the computing device, MQDF classifier training for each of the plurality of classes using the mean for each of the plurality of classes and the clustered covariance matrices; and
    assigning, by the computing device, a different number of principal components to at least a portion of each of the plurality of classes; and
    storing, by the computing device, in a reduced memory space, the principal components of the class covariance matrices, as a result of the clustering of the covariance matrices and the assigning of the different number of the principal components to at least a portion of each of the plurality of classes.

2. The method of claim 1, wherein the number of principal components assigned to a class in the plurality of classes is determined based on a usage frequency of that class and a number of variations among representations of elements in that class.

3. The method of claim 1, wherein the pattern recognition system is for handwriting recognition.

4. The method of claim 1, wherein a multivariate Gaussian distribution is estimated for each of the plurality of classes using the training data set within a high dimensional feature space.

5. The method of claim 4, wherein the feature space is 128 dimensional.

6. The method of claim 1, wherein the pattern recognition system is for performing at least one from a set of: speech recognition, handwriting recognition, document categorization, and shape recognition.

7. A system for performing MQDF training with flexible compression in a pattern recognition system, the system comprising:
a memory;
a processor coupled to the memory, wherein the processor is configured to execute program modules including:
a pattern recognition application that includes:
a recognition module configured to:
receive a plurality of training data sets for each of a plurality of classes;
featurize each training data set resulting in a mean and a covariance matrix for each of the plurality of classes;
cluster the covariance matrices, utilizing a predefined compression factor, to generate shared covariance matrices, the predefined compression factor comprising a compression factor, within a predetermined range of compression factors, wherein within the predetermined range of compression factors, there is a slight variation in isolated character classification rates between each of the compression factors in the range, the slight variation being indicative of a significant memory space reduction without at least one of a corresponding error increase and a classification accuracy degradation in the pattern recognition system; and
perform MQDF training for each class using the mean for each of the plurality of classes and the shared covariance matrices; and
assign a different number of principal components to each of the plurality of classes, the number of principal components assigned to a class in the plurality of classes being determined based on a usage frequency of that class and a number of variations among representations of elements in that class, wherein the clustering of the covariance matrices and the assigning of the different number of principal components to each of the plurality of classes results in a reduction of a memory needed for storing the covariance matrices and the principal components.

8. The system of claim 7, wherein the number of principal components assigned to a class is increased in proportion to the usage frequency.

9. The system of claim 7, wherein recognition module is further configured to cluster the covariance matrices uniformly across all of the plurality of classes.

10. A computer-readable storage device with instructions encoded thereon which, when executed by a computing device, will cause the computing device to perform a method for performing MQDF training with flexible compression in a pattern recognition system, the method comprising:
receiving a plurality of training data sets for each of a plurality of classes;
featurizing each training data set resulting in a mean and a covariance matrix for each of the plurality of classes;
clustering the covariance matrices, utilizing a predefined compression factor, to generate shared covariance matrices, the predefined compression factor comprising a compression factor, within a predetermined range of compression factors, wherein within the predetermined range of compression factors, there is a slight variation in isolated character classification rates between each of the compression factors in the range, the slight variation being indicative of a significant memory space reduction without at least one of a corresponding error increase and a classification accuracy degradation in the pattern recognition system;
assigning a different number of principal components to each of the plurality of classes, wherein the number of principal components assigned to a class in the plurality of classes is determined based on a usage frequency of that class and a number of variations among representations of elements in that class; and
performing MQDF training for each of the plurality of classes using the mean for each of the plurality of classes and the shared covariance matrices.

11. The computer-readable storage device of claim 10, wherein the pattern recognition system is for handwriting recognition.

12. The computer-readable storage device of claim 10, wherein the instructions further comprise clustering the covariance matrices in groups such that greater compression of characters with lower unigram frequency is enabled in a handwriting recognition application.

* * * * *